Patented May 9, 1939

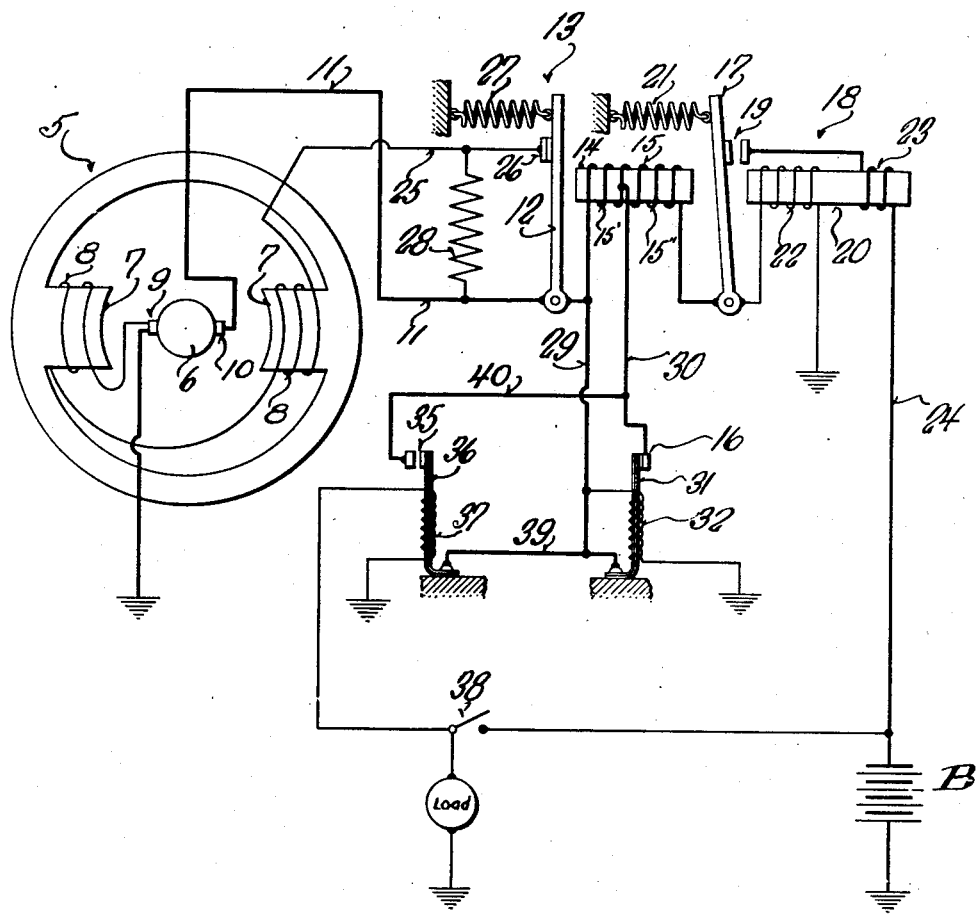

2,157,661

UNITED STATES PATENT OFFICE 2,157,661

GENERATOR OUTPUT REGULATOR SYSTEM

John W. Fitz Gerald, Milwaukee, Wis., assignor to Briggs & Stratton Corporation, Milwaukee, Wis., a corporation of Delaware Application December 9, 1937, Serial No. 178,948

5 Claims. (Cl. 171—314)

This invention relates to improvements in output regulators for motor generators such as employed in automobiles for keeping the battery charged, and refers particularly to that type of regulator shown in Patent No. 2,800,257 issued to John W. Fitz Gerald May 11, 1937.

As in the above mentioned patent, the present invention contemplates voltage as well as current control for the regulator, so that the charging rate will be reduced upon the attainment of a predetermined voltage across the battery even though the current flow may be insufficient to operate the regulator. However, making the regulator dependent upon voltage as well as current, is apt to cause a constant fluctuation from a high to a low charging rate when a load is applied. To illustrate: assume that the charging rate has been reduced in response to the attainment of a predetermined voltage across the battery. If a load is now applied, the battery voltage will drop quickly, thus causing the regulator to restore the charging rate to a high value. The voltage again builds up and the charging rate is again reduced. This continues as long as the load is on, and where the load consists of a lamp or lamps, it is obvious that an objectionable fluctuation from bright to dim will be inevitable.

The present invention therefore has as an object to provide means operable upon the application of a load on the system to so control the regulator that the high charging rate will obtain as long as the load is on.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

The single figure is a diagrammatic illustration of an output regulator system embodying this invention.

Referring now particularly to the accompanying drawing in which like numerals indicate like parts, the numeral 5 represents generally a generator having an armature 6 and a field magnet provided with poles 7. The poles 7 are equipped with field windings 8 connected in series and shunt wound with respect to the armature 6. Brushes 9 and 10 provide terminals for the armature windings and for one side of the field windings in the customary manner.

The brush 9 is connected to the ground and has one end of the field winding 8 connected thereto, while the brush 10 is connected through a conductor 11 to the armature 12 of a conventional vibrating regulator unit 13. Besides the armature 12, the vibrating regulator unit includes an electromagnet 14, the coil 15 of which is tapped to divide the same into two sections 15' and 15". The section 15" is at all times connected with the generator, whereas, the section 15' is shorted out of circuit until a predetermined voltage is attained across the battery by an electrothermal switch 16, which, upon opening, inserts the section 15' in circuit so that the strength of the electromagnet 14 is increased proportionately to cause the armature to respond at a lower current flow. The manner in which the switch is controlled will be described hereinafter.

To enable the entire coil to be connected in the circuit, one side thereof is connected directly with the armature 12, whereas, the tap on the coil connects with the armature through the switch 16. The other side of the coil is connected to the armature 17 of a reverse current cutout 18 of conventional design.

As is customary, the cutout 18 embodies a pair of contacts 19 adapted to be closed when its armature responds to energization of its electromagnet 20. When electromagnet 20 is not energized, a spring 21 holds the armature 17 in a position at which the contacts 19 are disengaged. A shunt coil 22 is permanently connected with the armature 17 and the ground to energize the electromagnet 20 upon initial functioning of the system.

Upon energization of the electromagnet 20, its armature 17 is drawn to its operative position, closing the contacts 19, whereupon a series winding 23 is connected in the circuit. One side of the series winding 23 is connected to one of the contacts 19 and its other side connects with a conductor 24 which leads to one side of the battery B. The other side of the battery is grounded.

The field winding circuit is completed through a conductor 25 which leads to a pair of normally engaged contacts 26. One of these contacts is mounted on the armature 12 of the regulator which is yieldingly held in its contact closing position by a spring 27. From the closed contacts 26, the circuit is completed through the armature 12 and the conductor 11 back to the brush 10.

When the current flowing through the electromagnet coil section 15" attains a predetermined amperage, the spring 27 is overcome and the armature 12 is drawn toward the electromagnet opening the field circuit at the contacts 26 and inserting a resistance 28 in the field circuit. The resistance 28 is connected in shunt with the armature 12, as shown.

By the introduction of the resistance 28, the field strength of the generator is appreciably lowered, and consequently its output is reduced. In this manner, constant amperage is maintained, the rate of which is determined by the strength of the spring 27 and the size of the air gap between the electromagnet 14 and the armature 12. Adjustment of either of these factors effects adjustment of the charging rate, as is well known.

The system thus far described, except for the electrothermal switch 16, constitutes a conventional constant current vibrating regulator control, but as in the patent hereinbefore referred to, this invention, in addition to current control, subjects the regulator to voltage control. This voltage control acts through the switch 16 and it opens the switch 16 and thereby increases the magnetic pull of the electromagnet 14 by inserting the coil section 15' so that the regulator responds at a lower current value to switch the system from its high charging rate to a predetermined low or "trickle" rate determined by the value of the resistance 28.

The switch 16 is interposed between conductors 29 and 30 so that whenever it is closed, the circuit from the conductor 11 to the tap on coil 15 extends through conductor 29, a bimetallic strip 31 which carries one contact of the switch 16, the closed switch 16, and the conductor 30 to the tap on coil 15.

The bimetallic strip 31 which carries the movable contact of the switch 16 is provided with a voltage responsive heater coil 32, one side of which is connected to the conductor 29 to be connected to the generator output, and the other side thereof is grounded. Hence, when the voltage builds up to the point where the heater coil 32 causes the bimetallic strip 31 to flex, the switch 16 is opened, and as a result, the coil section 15' is inserted in the circuit.

Assuming that the switch 16 has been opened in the manner just described, and that the system is operating on a "trickle" charging rate, if a load is now applied, the voltage from the battery will very quickly drop below the value at which the switch 16 opened and consequently the switch will reclose and throw the system back on its high charging rate. As soon as the voltage again reaches the value at which the switch 16 opens, the system goes back to the "trickle" charging rate. In other words, the thermostatically controlled switch 16 will open and close, causing the system to operate alternately at a low and a high charging rate. The result, as pointed out hereinbefore, is that a lamp or lamps constituting the load fluctuate between bright and dim.

To overcome this objectionable characteristic, an additional thermostatic switch 35 is provided. This switch is similar to the switch 16 and also has its movable contact carried by a bimetallic strip 36. The heater coil 37 of this thermostatic switch has one side grounded and has its other side connected to the dead side of the load switch 38 so that upon closure of the switch 38, the heater coil 37 is connected across the battery.

The flow of the current through the heater coil 37 and its consequent temperature rise causes the bimetallic strip 36 to flex in a direction to close the switch 35. With the closure of the switch 35, the switch 16 is cut out of the circuit so that regardless of its then position, the coil section 15' will be short-circuited so that the system will operate on its high charging rate. The connection from the generator to the coil 15 is now through the conductor 29, the conductor 39, the bimetallic strip 36, the switch 35, a conductor 40, and the conductor 30 which connects to the tap on coil 15.

Hence, it will be seen that regardless of what the charging rate is at the time the load is applied, the closure of the switch 35 will insure a high charging rate as long as the load remains on the system. In this manner objectionable fluctuation in voltage and its consequent undesirable effects upon the load is entirely eliminated.

What I claim as my invention is:

1. In combination: a generator; a battery connected with the generator and adapted to be charged thereby; current responsive means for regulating the charging rate; voltage responsive means for augmenting the current responsive means to make the same operable at a lower amperage; said voltage responsive means functioning only upon the attainment of a predetermined maximum voltage; means for connecting a load across the battery; and means operable upon connection of the load across the battery for cutting the voltage responsive means out of the circuit.

2. In combination: a generator; a battery connected with the generator and adapted to be charged thereby; current responsive means for regulating the charging rate; thermal means operable by the voltage across the battery, but only upon the attainment of a pre-determined maximum voltage for rendering the current responsive means operable at a lower amperage than that for which it is set to operate; means for connecting a load across the battery; and thermal means operable upon connection of the load across the battery for short circuiting said other thermal means.

3. In combination with a generator, a storage battery connected with the generator and adapted to be charged thereby and a current responsive regulator for controlling the output of the generator, said current responsive regulator having a magnet coil: means normally short circuiting part of the magnet coil and operable upon the attainment of a pre-determined voltage across the battery for placing all of the magnet coil in circuit to make the regulator responsive to a lower amperage than that for which it is set to operate; means for connecting a load across the battery; and means rendered operative upon connection of the load across the battery for short circuiting said voltage responsive means so that part of the magnet coil is short circuited as long as the load remains connected across the battery.

4. In a battery charging system having a generator and a current responsive regulator for controlling the output of the generator: means operable by the voltage across the battery, but only upon the attainment of a pre-determined maximum voltage for rendering the current responsive regulator operable at a lower amperage than that for which it is set to operate; means for connecting a load across the battery; and means rendered operative by the connection of the load across the battery for short circuiting the voltage responsive means to make the regulator responsive solely to current.

5. In a battery charging system of the character described, including a regulator having a current coil operable upon a pre-determined amperage to actuate the regulator and reduce the charging rate: voltage responsive means for normally short circuiting part of the coil and operable upon the attainment of a pre-determined voltage across the battery for inserting said part of the coil in circuit so that the regulator responds to lower the charging rate at a lower amperage than that for which it is set; means for connecting a load across the battery; and means rendered operative upon the connection of the load across the battery for short circuiting said voltage responsive means and consequently said portion of the current coil in the regulator.

JOHN W. FITZ GERALD.